DEMULTIPLEXING AND DETECTING SYSTEM FOR PREDICTED WAVE PHASE-PULSED DATA TRANSMISSION SYSTEM

Filed May 24, 1965 7 Sheets-Sheet 1

INVENTORS
ROBERT C. CARTER
PAUL M. CUNNINGHAM
ROBERT D. TOLLEFSON
BY Moody & Anderson
AGENTS INVENTORS
ROBERT C. CARTER
PAUL M. CUNNINGHAM
ROBERT D. TOLLEFSON
BY
Moody & Anderson
AGENTS INVENTORS
ROBERT C. CARTER
PAUL M. CUNNINGHAM
ROBERT D. TOLLEFSON
BY Moody & Anderson
AGENTS INVENTORS
ROBERT C. CARTER
PAUL M. CUNNINGHAM
ROBERT D. TOLLEFSON
BY
Mody & Anderson
AGENTS

*INVENTORS*
ROBERT C. CARTER
PAUL M. CUNNINGHAM
ROBERT D. TOLLEFSON
BY
Moody & Anderson
AGENTS INVENTORS
ROBERT C. CARTER
PAUL M. CUNNINGHAM
ROBERT D. TOLLEFSON
BY
Moody & Anderson
AGENTS INVENTORS
ROBERT C. CARTER
PAUL M. CUNNINGHAM
ROBERT D. TOLLEFSON
BY Moody & Anderson
AGENTS 3,368,036

DEMULTIPLEXING AND DETECTING SYSTEM FOR PREDICTED WAVE PHASE-PULSED DATA TRANSMISSION SYSTEM

Robert C. Carter, Paul M. Cunningham, and Robert D. Tollefson, Richardson, Tex., assignors to Collins Radio Company, Cedar Rapids, Iowa, a corporation of Iowa Filed May 24, 1965, Ser. No. 458,158
16 Claims. (Cl. 178—67)

This invention relates generally to phase detection techniques and more particularly to an arrangement for demodulating transmitted data wherein the data is encoded in terms of discrete phase shifts between successive transmission intervals.

More specifically, the present invention relates to an improved demultiplexing and detection arrangement by means of which the information encoded in a plurality of information channels may be recovered for subsequent processing and reproduction of a plurality of messages in the form of binary information.

The detection circuitry of the present invention is applicable to a type of binary data transmission known as a Kineplex data transmission system. The Kineplex data transmission system transmits information in binary fashion by encoding binary bits as discrete phase shifts between successive transmission intervals wherein generally, for example, a change in phase between sucessive transmission intervals might correspond to a "mark" and no change in phase between successive transmission intervals might correspond to a "space." Reference is made to patent No. 2,905,812 to Melvin L. Doelz et al., entitled, "High Information Capacity Phase-Pulse Multiplex System" wherein is described such a combination data transmission system. A further discussion of the Kineplex data transmission technique is described in a paper entitled "Binary Data Transmission Techniques for Linear Systems," Proceedings of the IRE, Volume 45, May 1957.

The above references define Kineplex data transmission systems wherein a plurality of tones modulated on a carrier are each in turn phase modulated at synchronous bit intervals so as to convey information. Each channel is defined by a discrete tone or subcarrier. Binary information is encoded as phase shifts between adjacent bits of transmission intervals. Demodulation or detection circuitry is employed for each tone or channel which includes high Q resonators as a means for regenerating, at the receiver, a phase reference for each successive bit or transmission interval. Means are employed to compare the phase of each transmission interval or bit with that of the preceding bit. Each transmission interval or pulse, as received, is used as a phase reference for the following pulse.

Briefly, the Kineplex data transmission system as defined in the above references, operates on a predicted wave signaling principle wherein;

(1) Information is encoded as successive phase reversals (or non-reversals).

(2) The phase information is quadraturized such that the phase of any bit interval ultimately corresponds to a mark or space in each of two information channels simultaneously phase encoded on a given tone.

(3) The receiver utilizes a pair of mechanical resonators being permitted to "ring" for one pulse interval as a means of storing the phase reference for analysis of the succeeding pulse.

(4) Phase measurements are decoded by phase detectors so arranged so as to interpret the phase reversals from pulse to pulse as originally encoded at the transmitter end.

As described in the above references, the Kineplex data transmission system may employ multiplexing techniques wherein a plurality of tones displaced in frequency by 1/T (where T is the time corresponding to the transmission bit intervals) may be simultaneously employed, and in turn, each bit interval of each tone simultaneously conveys two information bits. The latter capability is realized by a quadraturized encoding of two binary information channels at the transmitter end. The receiver operates on each phase vector to essentially resolve the vector into normal and quadrature components. The normal components correspond to the first information channel and the quadrature component corresponds to the second information chanel. Utilizing this technique, the Kineplex data transmission system optimizes the information carrying capabilities in terms of bandwidth and time.

In the Kineplex systems above referenced a mechanical resonator is utilized to separate the tone channels. A pair of resonators tuned to each tone are required for demultiplexing and detection of the transmitted data. The tones are so separated that cross-talk between adjacent channels or tones is minimized or eliminated. It is apparent, therefore, that in a system employing twenty channels, that is, twenty tones, resonator-pairs tuned to twenty different frequencies must be employed in the overall system. This requirement necessitates an inventory of twenty different resonators for the system.

Furthermore, mechanical resonators are critical in nature, since both the resonant frequency of the resonator and the insertion loss of the resonator are functions of temperature. When it is required that the overall circuit operates in a wide temperature range, an oven is required for stabilization.

The present Kineplex data communication system employing mechanical resonators necessitates numerous adjustments, many of which are interdependent and the procedure becomes tedious and lengthy.

It is an object therefore of the present invention to provide a system for demultiplexing and detecting a Kineplex signal in which the need for a plurality of mechanical resonators, tuned to various tones, is eliminated and in which, instead, reference frequencies are applied externally rather than being built-in in the form of the mechanical resonators. Since the reference frequencies are external to the device they may be readily synthesized from a frequency standard the accuracy of which may be precisely controlled.

A further object of the present invention is to provide a demultiplexing and detection circuitry for a Kineplex data transmission signal wherein critical frequency requirements are removed from the circuitry.

A still further object of the present invention is the provision of a demultiplexing circuitry for a multichannel Kineplex data transmission system wherein all circuitry is composed of commonplace parts.

Still another object of the present invention is the provision of a Kineplex data transmission demultiplexing circuitry which employs a single type of circuit for all tone frequencies involved rather than a plurality of discretely different mechanical resonator elements, pairs of which are tuned to each particular information channel.

The invention is featured in a means by which each particular tone is beat down to D.C., the D.C. component then being integrated over the "drive time" interval to yield phase information from a particular tone.

These and other features and objects of the invention will become apparent upon reading the following description in conjunction with the accompanying drawings in which.

Figure 1:
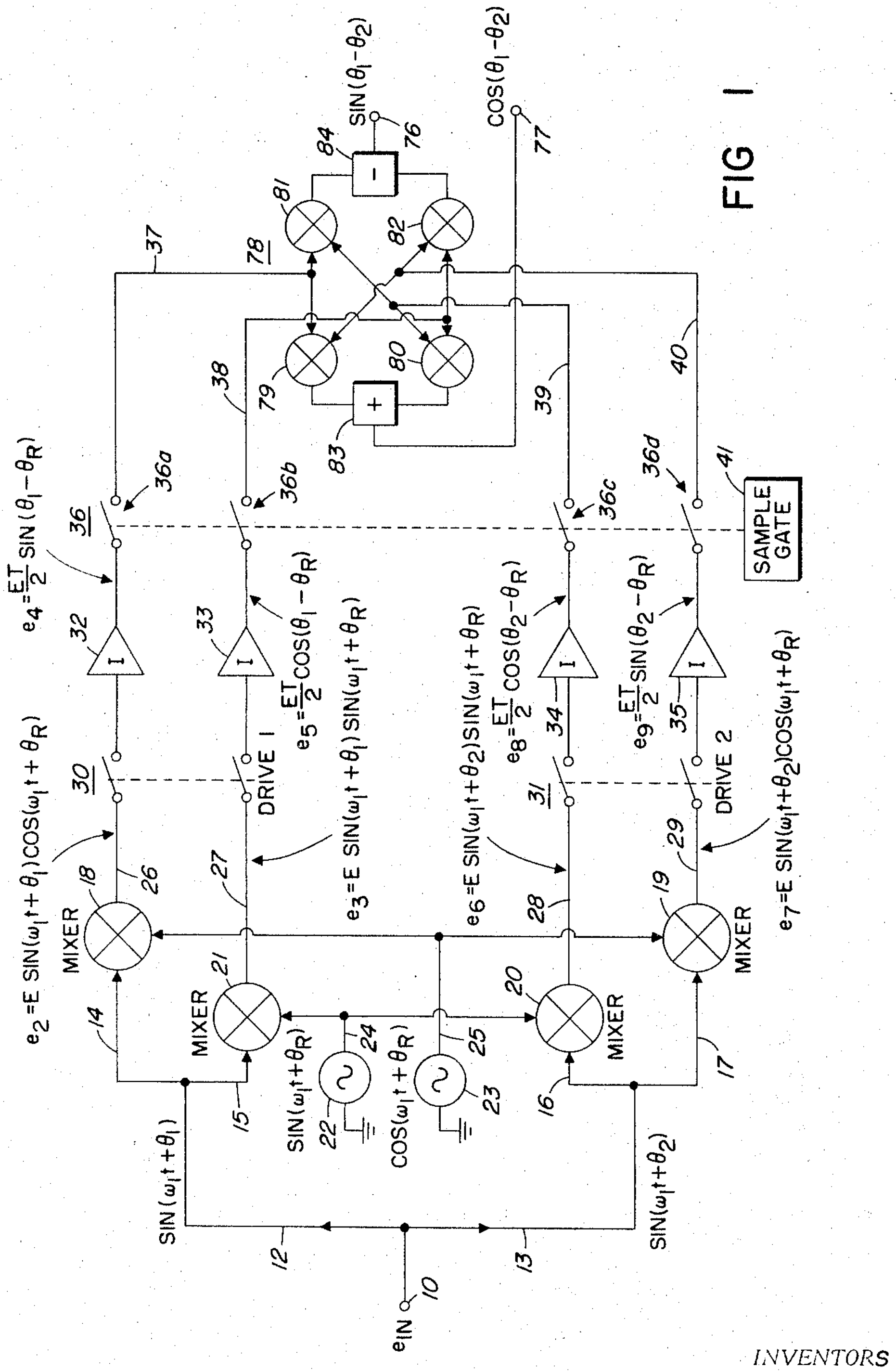
FIGURE 1 is a functional diagram of a single tone embodiment in accordance with the present invention.

Before proceeding with the description of the present invention it should be emphasized that the basic Kineplex data transmission system is one wherein synchronous transmission intervals are employed. Information is encoded at the transmitter in the form of discrete phase shifts between successive transmission intervals such that the phase reference at the receiver, for any particular transmission interval or frame, becomes merely the phase of the preceding transmission interval. The receiver then normally employs mechanical resonators in pairs for each received tone. The resonator pairs, as presently employed in systems, are tuned to each of the tones of the system. The detection principle used in detecting the information conveyed on each tone in the form of phase shifts intervals utilizes the resonator pairs as means for ringing in phase with the transmission interval and then storing this phase information for the period of the succeeding transmission interval. The resonator pairs are gated alternately in synchronism with the transmission intervals such that one is storing phase information corresponding to the previous transmission interval while the other is receiving the instant transmission interval. The system permits multiplexing wherein pluralities of discretely separated tones may each be phase encoded to convey information. A sampling technique is thus employed in synchronism with the transmission intervals wherein the outputs from the resonator pair are simultaneously sampled towards the end of each interval and the sample is applied to detecting circuitry to develop binary output information which defines the phase shift between each transmission interval and the preceding interval. The resonators, as such, then serve alternately as built-in phase references and phase storage devices such that the phase of any given transmission interval may be used as the reference for phase comparison between it and the succeeding transmission interval. The detection technique utilizing mechanical resonators is thus basically an A.C. integration process taking place at the resonant frequency of the mechanical resonator.

The present invention provides two general methods to demodulate and demultiplex a Kineplex data transmission signal each of which generally beats a particular tone down to D.C. and integrates the D.C. component over a transmission interval or "drive time" to yield phase information from a particular tone.

Two methods or embodiments will be presented.

A first method integrates and stores four components of phase information on capacitors, and the accumulated voltages are sampled and converted directly to pulses corresponding respectively to the sine and cosine of the angle defining the change in the phase between successive transmission intervals. A second method integrates and stores four components of phase information on capacitors and then chops and recombines the stored voltages in such a way as to synthesize a signal similar in wave shape to that developed by the mechanical resonator elements currently employed in Kineplex systems. The signals so developed may then be processed (detected) in a manner similar to that utilized in present Kineplex systems by application to direct and quadrature phase detectors to simultaneously recover the two channels of information present on each tone.

Figures 4, 5:
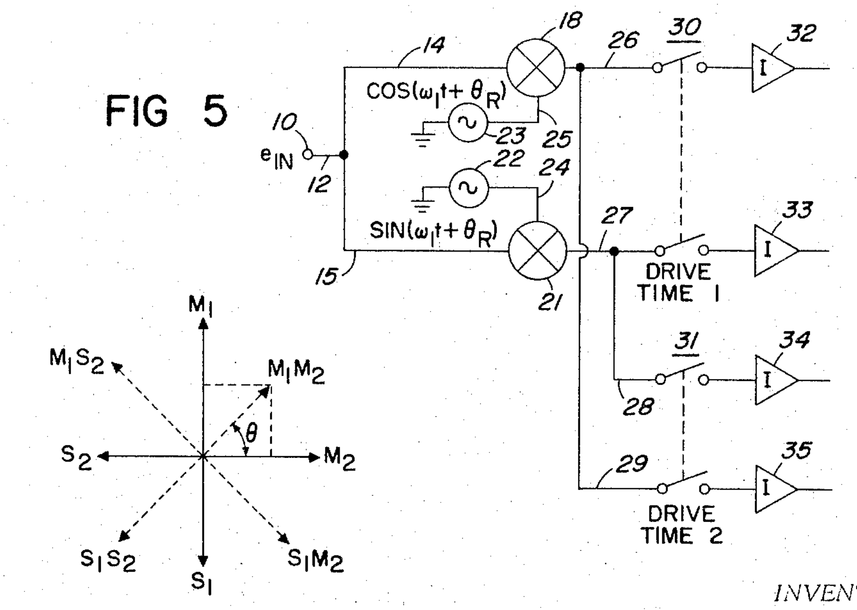
FIGURE 4 illustrates the coding pattern of the phase shift modulation for the two information channels which may be carried on a single tone in a Kineplex data transmission system.
FIGURE 5 illustrates a simplification of the basic functional diagram of FIGURE 3.

A brief consideration will first be given to the phase encoding pattern employed in a Kineplex system by means of which phase shift modulation for two channels may be carried on a single tone. Reference is made to the vector diagram of FIGURE 4 which illustrates in heavy lines, vectors representing four pulses designated as $M_1$, $M_2$, $S_1$ and $S_2$. These vectors represent "mark" and "spaces" for the two channels. The dotted lines designated as $M_1M_2$, $S_1M_2$, $S_1S_2$ and $M_1S_2$ represent the phases of the transmission intervals which are actually transmitted by the transmitter. It is to be noted therefore that the vector $M_1M_2$ indicates that both channels 1 and 2 are "mark." The vector $S_1S_2$ represent that both signals are "space," and the other two $S_1M_2$, and $M_1S_2$, represent respectively "space" in one channel and "mark" in the other. It is to be realized also that in accordance with Kineplex data transmission techniques the phase reference of the transmission interval is that of the preceding pulse and is not an absolute reference. It is to be further noted that only odd multiples of 45° are allowed states from frame to frame. Reference to FIGURE 4 shows that the relative phase between adjacent transmission intervals will be either 45°, 135°, 225°, or 315°. These relative phase shifts are the only allowed phase shifts in the system.

Reference to FIGURE 4 illustrates that the vectors $M_1$, $M_2$, $S_1$ and $S_2$ are quadrature projections of the dotted line vectors on the vertical and horizontal axes of the diagram. This defines the quadrature encoding arrangement peculiar to Kineplex systems. The vector $M_1M_2$, corresponding to a phase shift of 45° between adjacent frames may represent a mark in both channels 1 and 2. Similarly, the vector $S_1M_2$, corresponding to 315° of phase shift between adjacent frames, may represent a space in channel 1 and a mark in channel 2. The quadrature projections of the composite vectors at odd multiples of 45° are seen to be defined respectively by the sine and cosine functions of the composite vectors. Thus, if information at the receiving end is developed in the form of two bits of information per frame, corresponding respectively to these sine and cosine functions, the necessary information to recover the transmitted binary data in two channels for each tone will have been recovered.

The present invention then operates to develop two such output bits of information per frame which are proportional respectively to the sine and cosine functions of the phase shift angle between adjacent frames. Numerous expedients may be employed to process these informations bits for ultimate storage in shift registers or into regenerated mark and space intervals duplicating the encoded information.

*Method I*

A first embodiment of the invention is functionally illustrated in FIGURE 1. The method of FIGURE 1 basically integrates and stores four components of phase information, the accumulated voltages being sampled and converted directly to pulses indicative respectively of the sine and cosine functions of phase shifts between succeeding frames.

Although the composite Kineplex signal may involve the multiplexing of a plurality of tones each of which carries phase-modulate data, the embodiment of FIGURE 1 will be first described with the assumption that only one tone is present on the input. With reference to FIGURE 1, the composite Kineplex signal 10 is applied to two input lines 12 and 13. The signal on line 12 is applied as a first input 14 to a mixer or product detector 18 and as a first input 15 to a mixer or product detector 21. Mixer 18 receives a second input 25 from a reference source 23 while mixer 21 receives a second input 24 from a reference source 22. As will be further described, reference sources 22 and 23 are in quadrature and of a frequency $\omega_1 T$ which corresponds to the incoming signal frequency.

The outputs 26 and 27 from mixers 18 and 21 are applied through a "drive time 1" switch 30 to the integrators 32 and 33 respectively. The outputs from integrators 32 and 33 are sampled periodically by means functionally depicted as a sample gate switch 36 so as to apply, during the sample interval, outputs 37 and 38 to an output network 78.

The input signal 10 is applied through line 13 as a first input 16 to a mixer or product detector 20 and also as a first input 17 to a mixer or product detector 19. Mixer 20 receives a second input 24 from reference source 22 while mixer 19 receives a second input 25 from reference source 23. The outputs 28 and 29 from mixers 20 and 19 are applied through a "drive time 2" switching means 31 as inputs to integrators 34 and 35 respectively. The outputs from integrators 34 and 35, during the duration of a sample gate from gate generating means 41, are applied as further inputs 39 and 40 to the output network 78.

Output network 78 comprises four further mixers or product detectors 79, 80, 81 and 82. The output sample 37 from integrator 32 is applied as an input to mixers 78 and 81. The output sample 38 from integrator 33 is applied as input to mixers 80 and 82. The output sample 39 from integrator 34 is applied as a second input to mixers 80 and 81 and the output sample 40 from integrators 35 is applied as a second input to mixers 79 and 82. The outputs from mixers 79 and 80 are applied to adding network 83 the output of which is applied to a first output terminal 77. The outputs from mixers 81 and 82 are applied to a further adding network 84 the output of which is applied to a second output terminal 76.

The "drive time 1" switch 30, the "drive time 2" switch 31, and the sample gate switch 36 are functionally depicted in FIGURE 1. It is to be realized that these switches, in an actual embodiment would comprise gating means operated synchronously with the aforedescribed transmission intervals which make up the composite input signal 10. As in the present Kineplex detection systems employing a mechanical resonator, the present invention operates to synchronously and alternately apply succeeding input transmission intervals to two detection channels. While a first channel (mixers 18 and 21, etc.) is integrating an input interval, the second channel (mixers 20 and 19, etc.) will be retaining phase information based on an integration function performed on the preceding transmission interval. Generally then, during that transmission interval when the drive time 1 switch 30 is closed, the outputs from mixers 18 and 21 are applied to integrators 32 and 33, respectively. Similarly, during the alternate interval when the drive time 2 switch 31 is closed, the outputs from mixers 20 and 19 are applied to integrators 34 and 35 respectively. Near the end of each transmission interval but after the closed drive time switch has opened, the sample gate switch 36 closes momentarily so as to simultaneously apply the outputs of all four integrators 32–35 to the output network 78. As will be further described, the integrator pairs 32–33 and 34–35 are alternately dumped or reset to zero at the conclusion of the drive interval during which they are storing phase information gathered from the previous interval.

Figure 2:
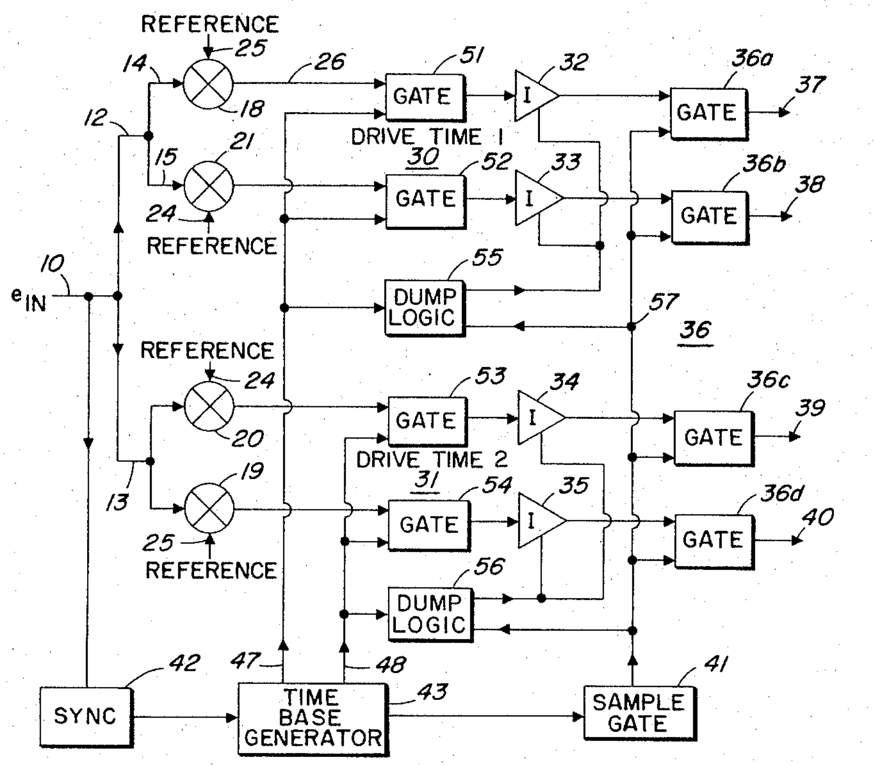
FIGURE 2 is a functional diagram illustrating a type of timing circuitry which may be employed in the embodiment of FIGURE 1.

The means for deriving the synchronous timing is parallel to that utilized in current Kineplex systems such as that described in above referenced U.S. Patent No. 2,905,812. It is to be realized that numerous expedients might be employed to accomplish the synchronous switching. FIGURE 2 represents functionally a timing arrangement of a type that might be employed in the embodiment of FIGURE 1 to effect the necessary synchronous timing. With reference to FIGURE 2, the input signal 10 is applied through line 12 as inputs 14 and 15 to mixers 18 and 21. Input signal 10 is simultaneously applied through line 13 as inputs 16 and 17 to mixers 20 and 19. A time-base generator 43 might then be controlled by means of synchronizing network 42 which receives the input signal 10 to develop a "drive time 1" output 47 and a "drive time 2" output 48 for alternate operation of the drive time gates $S_2$ and $S_3$, respectively.

FIGURE 2 represents the "drive time 1" switch 30 as being comprised of a pair of gates 51 and 52 under the control of output 47 from time base generator 43 such that the gates 51 and 52 close on alternate transmission intervals. Further description will bear out that the "drive time 1" gate from generator 43 may be applied to a dumping or reset logic network 55 along with the output 57 of a sample gate generator 41 to effect a synchronous means of resetting integrators 32 and 33 to zero. A "drive time 2" output 48 from time base generator 43 is applied to a further pair of gates 53 and 54 which function as the drive time 2 switch 31 of FIGURE 1. A further dumping logic network 56, under the control of the "drive time 2" output 48 and the 10 micro-second sampling gate line 57 may then operate to reset integrators 34 and 35 to zero at the proper time.

The manner in which the embodiment of FIGURE 1 operates to develop first and second output proportional respectively to the sine and cosine functions of phase shift between successive input frames may be best comprehended with reference to the waveform expressions of FIGURE 1.

As previously described, the input signal is a composite Kineplex signal comprised of successive transmission intervals or frames each of which bears one of four phase relationships with the preceding intervals. These phase relationships are defined as odd multiples of 45° and thus any given transmission interval will exhibit a phase relationship compared to the preceding frame of either 45°, 135°, 225°, or 315°. For purpose of describing the operational aspects of this invention we shall define the input signal during a first frame as being sin $(\omega_1 t+\theta_1)$, where $\omega_1 t$ is the tone frequency and $\theta_1$ represents its particular phase. It is to be emphasized that the phase $\theta_1$ is not based on an absolute reference since ultimate phase comparison will be made on the basis of comparing the phase of each frame with that of the preceding frame. We shall define a succeeding frame as being sin $(\omega_1 t+\theta_2)$. The phase between successive frames may be defined as $(\theta_1-\theta_2)$.

Referring to the general functional diagram of FIGURE 1 during frame 1 period of time, an input defined as sin $(\omega_1 t+\theta_1)$ is applied as first inputs to each of mixers 18–21.

Since the general operational theory is based on alternate integration and storage functions of a pair of detection channels, the ensuing description will treat the operation of mixer pairs 18–21 and 19–21 as occurring in alternate fashion. It is to be realized that the input signal 10 is simultaneously applied to each of the upper and lower channels of FIGURE 1 and that the mixers 18–21 simultaneously develop outputs. From an operational standpoint, however, the operation of a particular mixer pair is pertinent only during that time when its associated drive time switch is closed so as to apply the outputs to the associated integrators. Let it be assumed then that during frame 1 period of time the input defined as sin $(\omega_1 t)$ is applied as a first input to mixers 18 and 21 in the upper channel of FIGURE 1 and that during the frame 1 period of time the "drive time 1" switch 30 is closed so as to apply the outputs of mixers 18–21 to integrators 31 and 33, respectively.

Mixer 18 receives a second input 25 from reference source 23 which may be defined as cos $(\omega_1 t+\theta_R)$ while mixer 21 receives a second input 24 from reference source 22 defined as sin $(\omega_1 t+\theta_R)$. Reference sources 22 and 23 are noted to be quadraturized and of a frequency $\omega_1 t$ corresponding to the input tone frequency and at a reference phase designated as $\theta_R$, it being realized that the reference sources are externally applied and their absolute phase reference is not correlated to that of the incoming signal 10.

Mixer 18 produces an output which is the product of the inputs thereto and thus the output 26 from mixer 18 may be expressed as:

$$e_2=E \sin(\omega_1 t+\theta_1) \cos(\omega_1 t+ {}_R)$$

Mixer 21 develops an output corresponding to the product of the inputs thereto which may be expressed as:

$$e_3=E \sin(\omega_1 t+\omega_1) \sin(\omega_1 t+\theta_R)$$

From trigonometric identities, the output 26 from mixer 18 may be expressed further as:

$$e_2=\frac{E}{2}[\sin(\theta_1-\theta_R)+\sin(2\omega_1 t+\theta+\theta_R)]$$

while the output 27 from mixer 21 may be expressed as:

$$e_3=\frac{E}{2}[\cos(\theta_1-\theta_R)-\cos(2\omega_1 t+\theta_R)]$$

Reference to the expressions above show that the outputs from mixers 18 and 21 contain sum and difference frequencies which, in this case, are equal, respectively, to twice the tone frequency $\omega_1 t$ and a D.C., component. These outputs are applied through the closed "drive time 1" switch 30 to integrators 32 and 33, respectively, and the integrators are sensitive only to the D.C. component of the mixer outputs. Thus, the output from integrator 32 may be defined as $$e_4=\frac{ET}{2}\sin(\theta_1-\theta_R)$$

while the output from integrator 33 may be defined as $$e_5=\frac{ET}{2}\cos(\theta_1-\theta_R)$$

The integrator outputs are so expressed as a valid approximation based on the following considerations:

The drive time switch 30 is closed for T time and the mixer outputs are integrated over this interval. Considering the integral of $e_3$ (the output 27 from mixer 21):

$$\text{Integrator output}=e_0=\int_0^T e_3 dt$$

$$e_0=\frac{E}{2}\int_0^T \cos(\theta_1-\theta_R)dt-\frac{E}{2}\int_0^T \cos(2\omega_1 t+\theta_1+\theta_R)dt \quad (1)$$

$$=\frac{ET}{2}\cos(\theta_1-\theta_R)-\frac{E}{4\omega_1}[\sin(2\omega_1 T+\theta_1+\theta_R)-\sin(\theta_1+\theta_R)$$

$$=\frac{ET}{2}\left\{\cos(\theta_1-\theta_R)-\frac{1}{2T\omega_1}[\sin(2\omega_1 T+\theta_1+\theta_R)-\sin(\theta_1+\theta_R)]\right\} \quad (2)$$

In the case under consideration there are hundreds of cycles of $\omega_1$ frequency during the drive time T. That is to say:

$$\omega_1 T \gg 1$$

Therefore the right hand term of Equation 2 is very small and $$e_0=\frac{ET}{2}\cos(\theta_1-\theta_R) \quad (3)$$

Thus the D.C. integrator 33 output at the end of the drive time is proportional to the cosine of the difference angle between the incoming signal and the reference signal.

The samples applied to lines 37 and 38 during the closing of the sample gate switch 36 are thus seen to be comprised of 10-microsecond pulses, the amplitudes and polarities of which are definitive respectively of the sine and cosine functions of the phase difference between a given transmission interval phase and the reference phase $\theta_R$.

During the succeeding transmission interval (frame 2) the "drive time 2" switch 31 is closed and the outputs from mixers 19 and 20 are applied to integrators 35 and 34 while the integrators 32 and 33 of the upper channel are retaining the information pertaining to the preceding frame. During frame 2 mixer 20 has applied thereto inputs which may be defined as sin $(\omega_1 t+\theta_2)$ and sin $(\omega_1 T+\theta_R)$. The output 28 from mixer 20 may then be expressed as:

$$e_6=E \sin(\omega_2 t+\theta_2) \sin(\omega_1 t+\theta_R).$$

Mixer 19 receives a reference defined as cosine $(\omega_1 t+\theta_R)$ and thus output 29 from mixer 19 may be expressed as:

$$e_7=E \sin(\omega_1 t+\theta_2) \cos(\omega_1 t+\theta_R)$$

Again, from trigonometric identities, the outputs 28 and 29 from mixers 20 and 19 may further be expressed as:

$$e_6=\frac{ET}{2}[\cos(\theta_2-\theta_R)-\cos(2\omega_1 t+\theta_2+\theta_R)]$$

$$e_7=\frac{ET}{2}[\sin(\theta_2-\theta_R)+\sin(2\omega_2 t+\theta_2+\theta_R)]$$

As considered above, the integrators are responsive only to the D.C. component of the input supply thereto and thus integrator 34 develops an output which may be expressed as $$e_8=\frac{ET}{2}\cos(\theta_2-\theta_R)$$

and integrator 35 develops an output which may be expressed as $$e_9=\frac{ET}{2}\sin(\theta_2-\theta_R)$$

It is thus seen that integrators 34 and 35, during "frame 2" develop outputs proportional respectively to the cosine and since functions of the phase difference between that of the frame 2 $(\theta_2)$ and that of the externally applied reference $(\theta_R)$.

The ten microsecond pulses 37, 38, 39 and 40 generated during sample time are utilized to form four additional products by application to output network 78 of FIGURE 1. A product detector 79 receives inputs 37 and 40 to develop the product.

$$\sin(\theta_1-\theta_R) \sin(\theta_2-\theta_R)$$

The product detector 80 receives inputs 38 and 39 to develop the product:

$$\cos(\theta_1-\theta_R) \cos(\theta_2-\theta_R)$$

A product detector 81 receives inputs 37 and 39 to develop the product:

$$\sin(\theta_1-\theta_R) \cos(\theta_2-\theta_R)$$

A fourth product detector 82 of output network 78 receives input 38 and 40 to develop the product:

$$\cos(\theta_1-\theta_R) \sin(\theta_2-\theta_R)$$

It is noted that the above products represent the four cross-products of the integrator output samples 37, 38, 39 and 40. By use of trigonometric identities, the sum of the products from detectors 79 and 80 equals cos $(\theta_1-\theta_2)$. Further, the difference of the product from detectors 81 and 82 equals sin $(\theta_1-\theta_2)$. Thus the output from mixers 79 and 80 are applied to an adding network 83 to develop a first output 77 equal to cos $(\theta_1-\theta_2)$. The outputs from mixers 81 and 82 are applied to a difference network 84 to develop a second output 76 defined as sin $(\theta_1-\theta_2)$. The two outputs 76 and 77 are thus proportional respectively to the sine and cosine functions of the phase shift between adjacent frames. It is noted that the output network 78 of FIGURE 1, through its function of forming cross products of the integrator output samples, and through its adding and subtracting functions, serves to develop the desired output signals as functions of the phase angle between succeeding input intervals and from which the phase, $\theta_R$, of the externally applied reference in the detecting system has been removed. The inputs to the four product detectors 79–82 are ten-microsecond pulses whose amplitudes (and polarities) are proportional to the integrator outputs. The two outputs 76 and 77 are ten-microsecond pulses whose amplitudes and polarities are proportional to the sine and cosine functions respectively of the difference angle of the phase shift between succeeding frames. This is seen to be output information desired, since, in the Kineplex coding scheme, bit information is represented by the difference angle from frame to frame.

Since, as previously described, the Kineplex signal is constructed such that only odd multiples of 45° are allowed states from frame to frame, the output signals 76 and 77 collectively contain two bits of information per frame.

The following table illustrates, in accordance with the allowed phases between succeeding input bits, the corresponding polarities of the output pulses:

| $\theta_1-\theta_2$ | sin $(\theta_2-\theta_2)$ | cos $(\theta_1-\theta_2)$ |
|---|---|---|
| 45° | + | + |
| 135° | + | − |
| 225° | − | − |
| 315° | − | + |

It is noted that these pulses collectively provide information which may be readily processed by amplification and clipping to obtain proper logic levels necessary for data recovery of two channels of information. For example, compare the output polarity representations of the above table with the phase encoding scheme of FIGURE 4.

Figure 3:
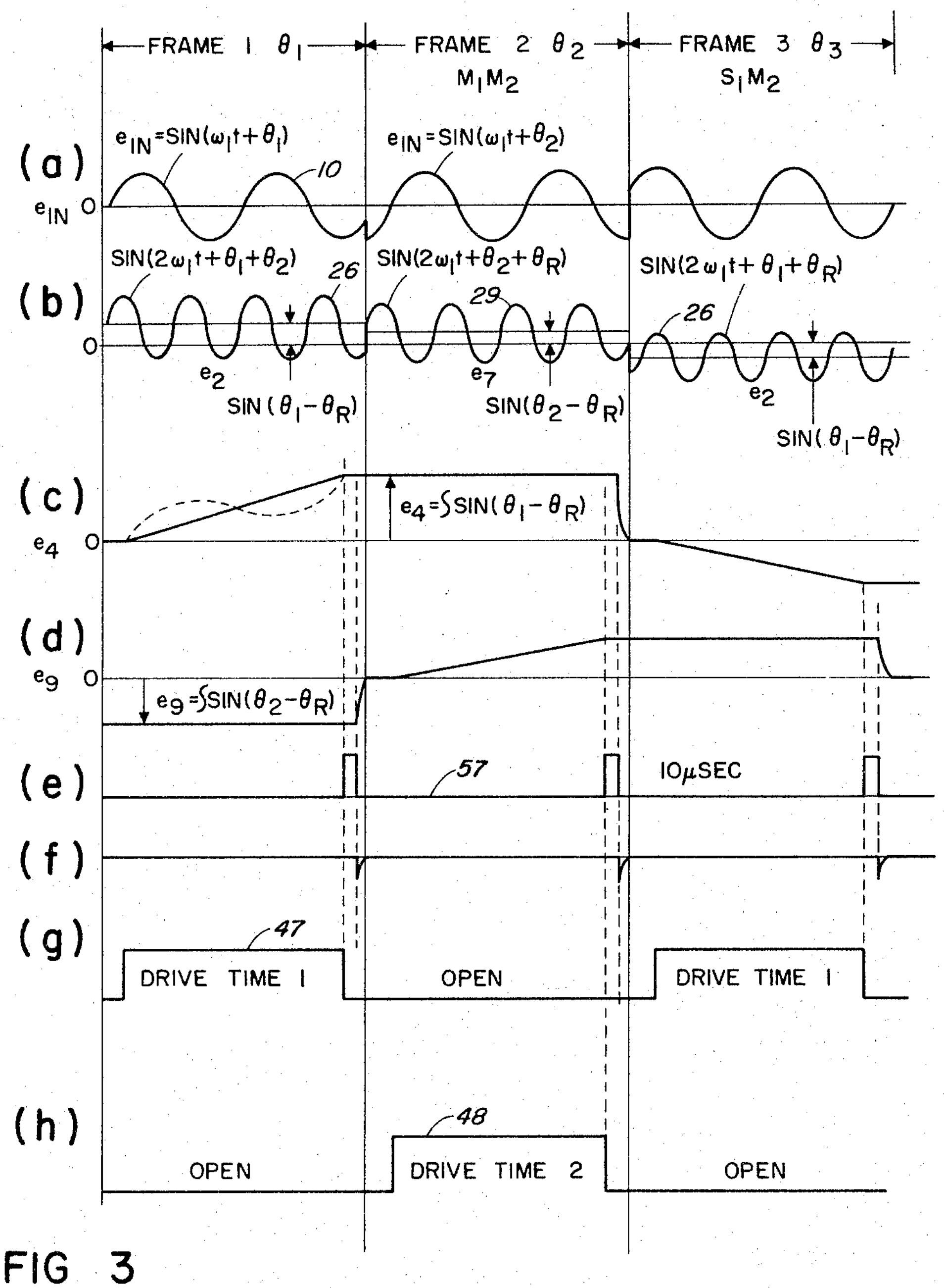
FIGURE 3 is a pictorial representation of certain operational waveforms of the embodiment of FIGURE 1.

An operational sequence of the embodiment of FIGURE 1 is depicted by operational waveforms in FIGURE 3. FIGURE 3(*a*) represents the composite Kineplex input signal 10 over a period of three successive transmission intervals or frames. While FIGURE 3(*a*) represents but two cycles of the input signal per frame, it is to be understood that 400 or more cycles would be contained in a single frame. Waveform 3(*a*) depicts therefore a first frame of $e_{in}$ as being sin $(\omega_1 t+\theta_1)$. A succeeding interval is defined as sin $(\omega_1 t+\theta_2)$. A third interval is depicted wherein the input waveform is phase shifted by a third angle. As illustrated, the second interval is phase shifted +45° with respect to the first interval, and the third interval is phase shifted 315° from the second interval. The first interval, it is understood, would be phase shifted by some odd multiple of 45° with respect to a previous interval. Referring to FIGURE 4, in accordance with the Kineplex phasing technique, the second interval of FIGURE 3(a) would represent a mark in both channels 1 and 2, that is, $M_1M_2$. Similarly, the third interval, in being phase shifted 315° with respect to the preceding or second interval, would represent a mark in channel 2 and a space in channel 1, or $M_2S_1$. The first interval would further carry two bits of information based on its relative phase with a preceding interval (not illustrated).

Waveform 3(*b*) represents the output products of mixers 18–21. Thus, assuming the first interval of waveform 3(*a*) is applied to mixer 18 with "drive time 1" switch 30 closed, the mixer output 26 is depicted in waveform 3(*b*) as the aforedescribed product containing a sine function at twice the input frequency and a D.C. component defined as sin $(\theta_1-\theta_R)$. During the second frame depicted in FIGURE 3(*a*) waveform 3(*b*) represents the waveform $e_7$ corresponding to the output 27 from mixer 19 in the lower channel, during which time "drive time 2" switch 31 is closed. The output 27 from mixer 19 is seen to be a double-frequency sine function and a D.C. component defined as sine $(\theta_2-\theta_R)$. The third interval of FIGURE 3(*b*) depicts again the product output $e_2$ from mixer 18 as being a double-frequency function together with a D.C. component which in this instance is a negative D.C. component since the phase of the third frame of FIGURE 3 is seen to exceed that of frame 2 by 315°, thus falling in a quadrant wherein the sine function is negative.

Although not depicted in FIGURE 3, it is to be realized, that similar product outputs would be obtained from mixers 21 and 20 wherein each interval would comprise a double frequency function in conjunction with the cosine function as a D.C. component.

Waveforms 3(*c*) and 3(*d*) represent respectively the outputs of integrators 32 in the upper channel of FIGURE 1 and integrator 34 in the lower channel of FIGURE 1. Previous discussions bore out that while the integrators in the upper channel were integrating the D.C. component of the mixer output applied thereto, the integrators in the lower channel would be retaining the integrated voltage obtained during the preceding interval. Thus, waveform 3(*c*) depicts the action of integrator 32 which receives the waveform 26. The integrator 32 linearly builds up, in accordance with the integral of the D.C. component sin $(\theta_1-\theta_R)$ of the product applied thereto. It is to be noted that the D.C. component is established by the difference in phase between the phase of the frame 1 and the reference phase $\theta_R$. The integrator output $e_4$ thus becomes the time integral of sine $(\theta_1-\theta_R)$ and this D.C. value is retained during the second frame. Immediately prior to the end of frame 2, integrator 32 is sampled and discharged, whereupon it is readied to integrate once again the D.C. component of the product applied thereto during the third interval.

Waveform 3(*d*) similarly depicts the output of integrator 19 in the lower channel of FIGURE 1 as retaining a negative value corresponding to a preceding interval, being sampled and discharged at the end of frame 1, integrating the D.C. component sine $(\theta_2-\theta_R)$ during the second interval, and retaining this information for the duration of the third depicted interval.

Waveforms 3(*c*) and 3(*d*) thus illustrate the alternate operation of the integrators in the upper and lower channels of FIGURE 1 wherein one integrator-pair is building up while the other pair is retaining charges built up during the preceding interval. Each integrator-pair develops an output during the duration of the interval applied thereto corresponding to the D.C. components of input product and stores the D.C. levels for the succeeding interval, whereupon it is discharged and again samples the succeeding interval.

Waveform 3(*e*) represents the ten-microsecond sampling pulses which would be generated in time synchronism with each interval so as to occur between the conclusion of drive time and the beginning of the next frame. The outputs of each of the integrators is sampled at this time for application of the output product detector 78.

Waveform 3(*f*), 3(*g*), and 3(*h*) represent timing waveforms in accordance with the timing arrangement depicted functionally in FIGURE 2. Waveforms 3(*g*) and 3(*h*) correspond respectively to the "drive time 1" output 47 and the "drive time 2" output 48 as might be obtained from time base generator 43. Thus, as waveform 3(*g*) is considered with respect to the functional operation of the "drive time 1" switch 30 of FIGURE 1, it is noted that the switch is closed and opened alternately and when closed permits the application of the corresponding output 26 from mixer 18 to integrator 32. Similarly, waveform 3($h$) provides the function of the "drive time 2" switch 31 of FIGURE 1.

Waveform 3($f$) represents the development of a negative spike at the conclusion of each sample gate 57 (waveform 3($e$)). With reference to FIGURE 2, the dump logic circuits 55 and 56 associated with the upper and lower channels, respectively, are seen to receive the sample pulses 57 along with drive time pulses 47 and 48, respectively. It is apparent that the logic circuit 55 might then include logic means to develop outputs to discharge the integrators 32 and 33. Similarly, logic circuit 56 might develop an output to discharge the lower channel integrators 34 and 35 by utilizing waveforms 3($f$) and 3($h$) in proper logic circuitry. The general means herein discussed to effect this discharge sequence in alternate fashion depicts but one approach by means of which the integrators may be discharged at the conclusion of the sample period and immediately prior to the succeeding drive interval so as to ready them for a further integrating operation.

The invention as thus far described has depicted the various circuit blocks in functional terms. Generally, mixers 18, 21, 20 and 19 may be conventional mixers producing an output containing the sum and difference frequency of the two inputs applied thereto.

In the interest of clarifying the operational principle of the invention, the foregoing description has defined the input signal 10 as being applied to two channels each of which contain a pair of mixers receiving the input. Each of the pair of mixers has further been described as receiving a second input as one of a pair of quadraturized reference signals 24 or 25. When considering the circuit of FIGURE 1, it is apparent that there exists a redundancy as concerns the employment of mixers 18, 19, 20 and 21 in that mixers 18 and 19 each receive the input signal 10 as a first input thereto and the reference signal 25 as a second input thereto. Further, mixers 20 and 21 each receive the input signal 10 as a first input and the reference signal 24 as a second input. It is apparent therefore that the basic circuit of FIGURE 1 might be simplified as in FIGURE 5 to include but a single pair of mixers to which the input signal 10 is applied. Thus, FIGURE 5 illustrates a simplification in utilizing, for example, only mixers 18 and 21 with the output 26 from mixer 18 additionally serving as the input 29 to integrator 35 in the lower channel and the output 27 from mixer 21 is additionally utilized as the input 28 to the integrator 34 in the lower channel. Alternatively, the employment of mixers 19 and 20 with the omission of mixers 18 and 21 might be used to provide the necessary mixing function between the input signal 10 and the quadraturized reference source. It is important, however, to consider the double inclusion of this mixing function as depicted in FIGURE 1 since further modification of the circuitry of FIGURE 1 will be considered on the basis of considering four mixing functions rather than the two mixing functions which are actually necessary in the basic embodiment.

As they are used here, the two input frequencies applied to each of the mixers are the same and therefore the sum output becomes twice the input frequency and the difference output becomes a D.C. component. The D.C. component is that which is utilized for integration purposes. The integrators 32–35 might be any properly designed operational amplifiers, the requirement being that the integrating function is linear in nature. In a preferred embodiment, the mixer-integrator-drive time switch combinations might comprise circuitry as defined in a copending application by Robert C. Carter, Ser. No. 458,157 filed May 24, 1965, entitled, "R.C. Correlator Circuit for Synchronous Signal Detection," and assigned to the assignee of the present invention.

The invention has thus far been described with the consideration that the input, $e_{in}$, was a signal tone. A typical Kineplex input signal comprises a plurality of tones each carrying phase pulsed data, in which case the input signal 10 would be applied simultaneously to a number of circuits corresponding to FIGURE 1, with respect to reference frequencies $\omega_1 t$, $\omega_2 t$, . . . $\omega_n t$, corresponding to one of the pluralities of tones in the composite input signal. When considering the FIGURE 1 circuitry as regards its particular tone $\omega_1 t$, it is to be realized that other tones would be applied to all channels simultaneously. However, in Kineplex systems, the frequency separation $\Delta f$ of the tones is related to the drive time $T_d$, by the relationship $$\Delta f = \frac{1}{Td}$$

Thus, if a tone $f_1$ and an adjacent channel tone $f_2$ are present on the input 10 of FIGURE 1, there will appear on the output of the mixers 18–21, a beat frequency equal to $\Delta f$. In one drive time interval, $\Delta f$ will have gone through exactly one complete cycle. In the following integration process the first half of the cycle will be canceled out by the second half so that at the end of the drive time interval the output of the integrator will be exactly the same value that it would have been if the $\Delta f$ component were not present. This situation is illustrated by the dashed waveform of FIGURE 3($c$). The relationship between this demultiplexing principle and the drive time is thus established as being critical in that if the drive time is too long or too short, or, if the incoming or reference frequencies are not correct, or the integration process is nonlinear, then there will appear on the output of the integrator an undesired adjacent channel component at the end of a drive time. It is to be further noted that additional tones may be present on the input if they are equally spaced by $\Delta f$. The second adjacent channel will appear as $2\Delta f$ on the mixer outputs, but their effects will be canceled in the integrator outputs since they will have completed exactly two cycles in one drive time. Similarly, the third adjacent channel will have completed two cycles in one drive time, etc.

The circuitry of the present invention thus operates to demultiplex a composite input signal of many tones since adjacent channel tones do not alter the integrator outputs at the conclusion of a drive time interval during which time the integrator sample is taken. In conventional Kineplex systems employing mechanical resonators, the demultiplexing arrangement is realized by the particular resonating modes of the resonator elements per se, wherein adjacent channel tones present null modes at the time the sample is taken for subsequent phase detection.

*Method II*

Figure 6:
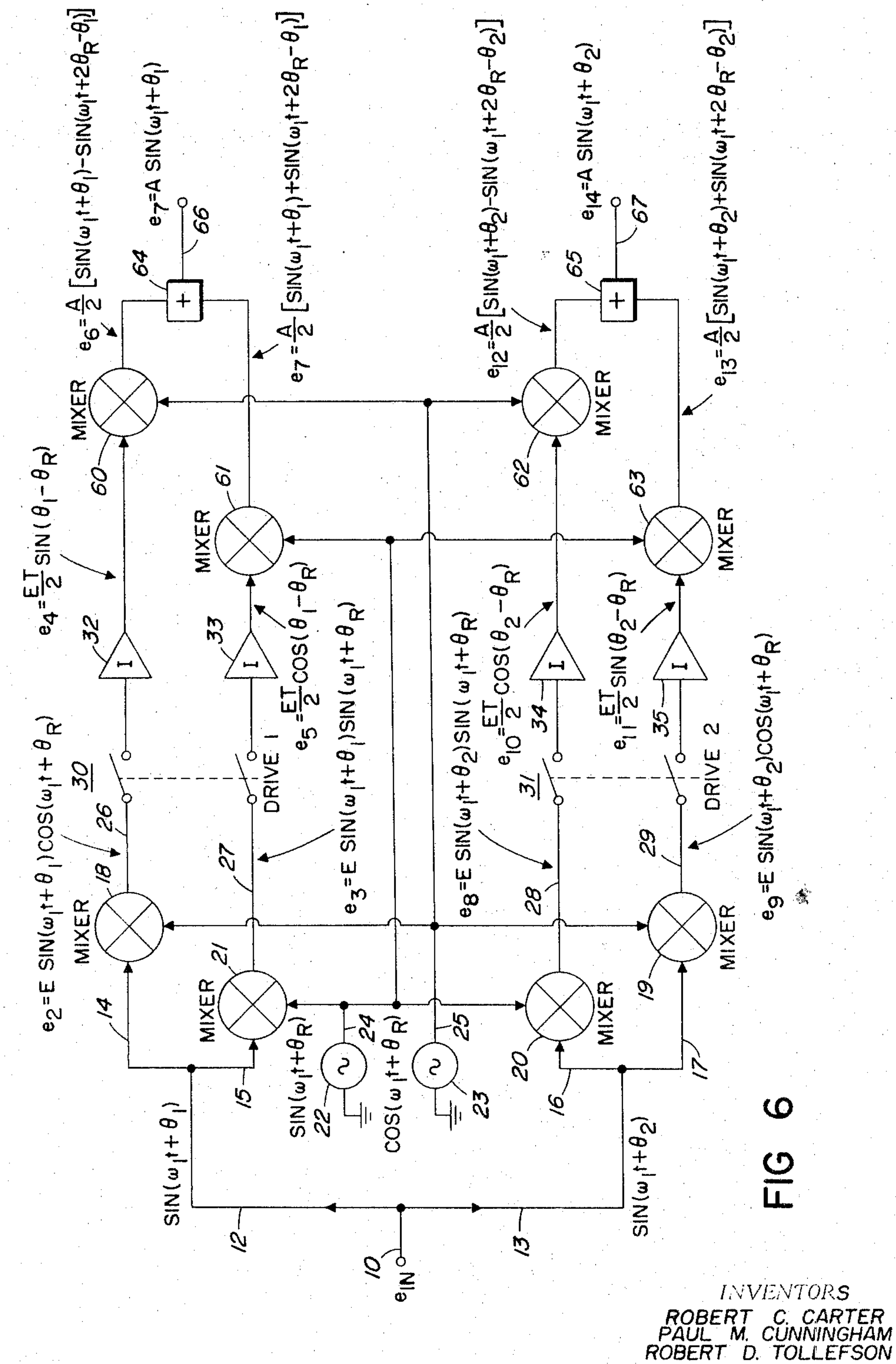
FIGURE 6 is a functional diagram of a further embodiment of the invention.

A further approach to a demultiplexing and detecting system in accordance with the invention is depicted in FIGURE 6. Comparing the circuitry of FIGURE 6 with that of FIGURE 1, it is seen that the circuitry is identical up to the output of the integrators 32–35. Corresponding reference numerals are utilized. In all respects, the embodiment of FIGURE 6 functions identically in operation from the application of the input signal 10 to the channels, through the development of integrator outputs which correspond to the integral of the D.C. components of the products applied from the associated mixers. Similarly, whereas the integrator outputs of the embodiment of FIGURE 1 were sampled and applied to an output product detector 78 from which the two desired output signals 76 and 77 correspond to the sine and cosine functions of the phase shifts between adjacent frames were developed, the approach of FIGURE 6 is to rechop the D.C. integrator outputs with the same reference signals applied to the first set of mixers 18–21. Actually, it is not necessary that the same reference signals be utilized as with a chopping frequency. However, as will be further described, a simplification of the circuitry of FIGURE 6 may be made if the chopping frequency is the same as the original reference frequencies.

Since the embodiment described in FIGURE 6 is identical with that of FIGURE 1 from the input through the integrator outputs, the mixer redundance previously described applies as well to the FIGURE 6 embodiment. Reference is again made to FIGURE 5 which illustrates that but a single pair of mixers need receive the input signal 10. FIGURE 5 illustrates only mixers 18 and 21 being employed, the output of each of the mixers being utilized in the upper and lower channels of the embodiment. As previously described, the output from these mixers is actually utilized only during that period of time when they are applied to a particular integrator through the closing of the associated drive time switch. Thus, as in FIGURE 1, FIGURE 6 in its basic form may be simplified as shown in FIGURE 5. The mixer redundancy is shown in FIGURE 6 since further discussion will consider a type of circuitry simplification wherein the various mixer-integrator drive time switch combinations may reduce themselves to still further simplified approaches. Reference to FIGURE 6 shows that the outputs of the integrators 32–35 are applied as first inputs to further mixers 60, 61, 62 and 63 respectively. The output 24 from source 22, corresponding to sin $(\omega_1 t+\theta_R)$ is applied as the second input to mixers 61 and 63. The output 25 from reference source 23, corresponding to cos $(\omega_1 t+\theta_R)$, is applied as a second input to mixers 60 and 62.

From trigonometric identities, the output from mixer 60 may be expressed as:

$$e_6=\frac{A}{2}[\sin(\omega_1 t+\theta_1)-\sin(\omega_1 t+2\theta_R-\theta_1)]$$

The output from mixer 61 may be expressed as:

$$e_7=\frac{A}{2}[\sin(\omega_1 t+\theta_1)+\sin(\omega_1 t+2\theta_R-\theta_1)]$$

The output from mixer 62 may be expressed as:

$$e_{12}=\frac{A}{2}[\sin(\omega_1 t+\theta_2)-\sin(\omega_1 t+2\theta_R-\theta_2)]$$

The output from mixer 63 may be expressed as:

$$e_{13}=\frac{A}{2}[\sin(\omega_1 t+\theta_2)+\sin(\omega_1 t+2\theta_R-\theta_2)]$$

From the above mixer outputs it is noted that the outputs $e_6$ and $e_7$ from mixers 60 and 61 contain the same components except for a reversal in sign of the sin $$(\omega_1 t+2\theta_R-\theta_1)$$

The outputs from mixers 60 and 61 are applied to a summing network 64 to develop an output 66 corresponding to:

$$A\sin(\omega_1 t+\theta_1)$$

Similarly, the outputs from mixers 62 and 63 are added in summing network 65 to develop a second output 67 which may be expressed as:

$$A\sin(\omega_1 t+\theta_2)$$

Figure 7:
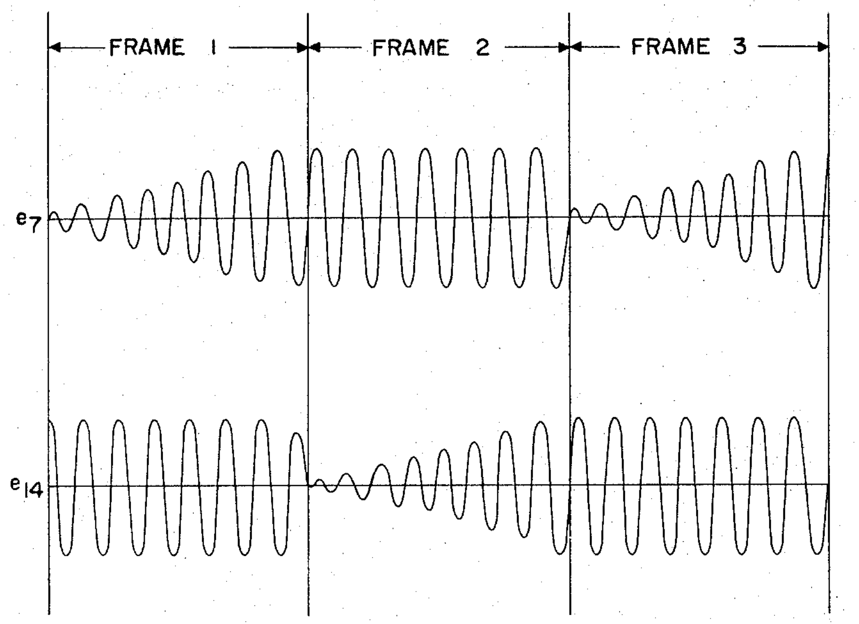
FIGURE 7 is a diagrammatic representation of the operational waveforms of the embodiment of FIGURE 6.

It is noted that the above defined outputs 66 and 67 are of the same mathematical form as the inputs 12 and 13. The primary difference, however, is that the output tone is now separated from the composite, since the inputs 12 and 13 will normally contain many tones. The output waveforms 66 and 67 will therefore appear, in most respects, similar to the mechanical resonator outputs in current Kineplex systems. The outputs 66 and 67 are depicted in FIGURE 7, wherein it is seen that the linearly increasing integrator function is chopped at the reference frequency during the frame interval when the integrator channel is being driven, and the amplitude at the end of the drive interval is retained during the succeeding interval as stored information at the reference frequency. It might be noted here, that, while the mixers 60, 61, 62, and 63 of FIGURE 5 are functionally represented, they may be comprised of different types of circuits to fulfill the requirements. One of the inputs to these mixers is D.C. rather than a time-varying function. The mixers therefore might be of the wide-band type whose frequency response extends down to D.C. An example of this would be a chopper-type amplifier which converts D.C. to A.C. The A.C. output would go to zero as the D.C. input goes to zero. The A.C. output would produce a 180° phase reversal as the D.C. changed in value from some positive potential to some negative potential. It might further be noted that the mixers 60 and 61, together with the indicated inputs, and in conjunction with the summing network 64, represent a conventional single sideband modulator. A variety of circuits are known in the art to perform this function.

The circuitry depicted in FIGURE 6 is seen to develop two outputs 66 and 67 in the form of alternate integration and storage periods based on the phase shift between adjacent frames or inputs signals. The transmitted data may be detected and compared for phase information in exactly the same manner as set forth in the above referenced Patent No. 2,905,812 and illustrated in FIGURE 10. The two tones may be applied in parallel to directed quadrature phase detectors, the outputs 76 and 77 of which would correspond to the two data channels.

Figure 8:
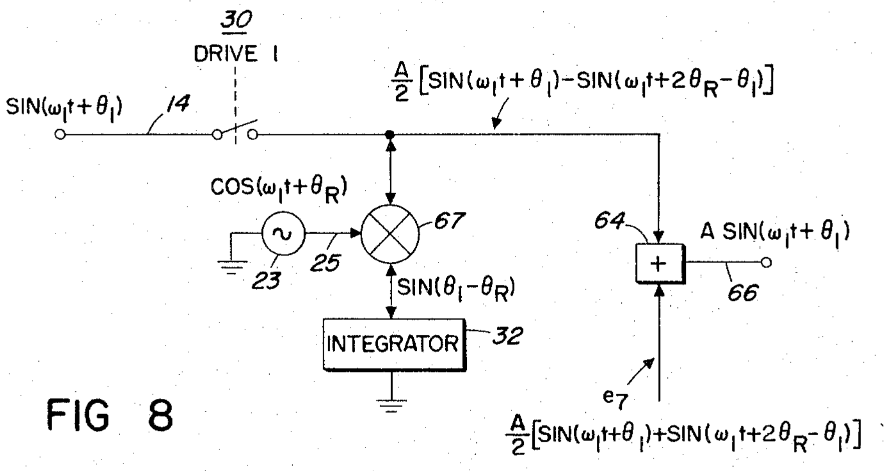
FIGURE 8 is a functional diagram illustrating a simplification of the system of FIGURE 5.

Because of the chopping frequencies applied to the mixers 60–63 of FIGURE 6 are identical with the original reference frequency from sources 22 and 23, the circuitry of FIGURE 6 may be simplified by combining the separate functions of two mixers into a single mixer. Note for example, that mixers 18 and 60 of FIGURE 6 have applied thereto the same reference frequency cos $(\omega_1 t+\theta_R)$, from reference source 23. It is further noted that the input 14 to mixer 18 is mathematically the same as that of the D.C. component of the output from mixer 60. Thus mixers 18 and 60 may be functionally represented as a single mixing operation as shown in FIGURE 8. From a functional standpoint, during "drive 1 time" the mixer 67 of FIGURE 8 performs the same function as mixer 18 of FIGURE 3. The integrator 32 stores the same information, sin $(\theta_1-\theta_R)$, as before. During frame 2, drive time 1 switch 30 is open and the integrator 32 supplies D.C. voltage to be chopped by the reference 25, and mixer 67 thus functions as mixer 60 of FIGURE 6.

Figure 10:
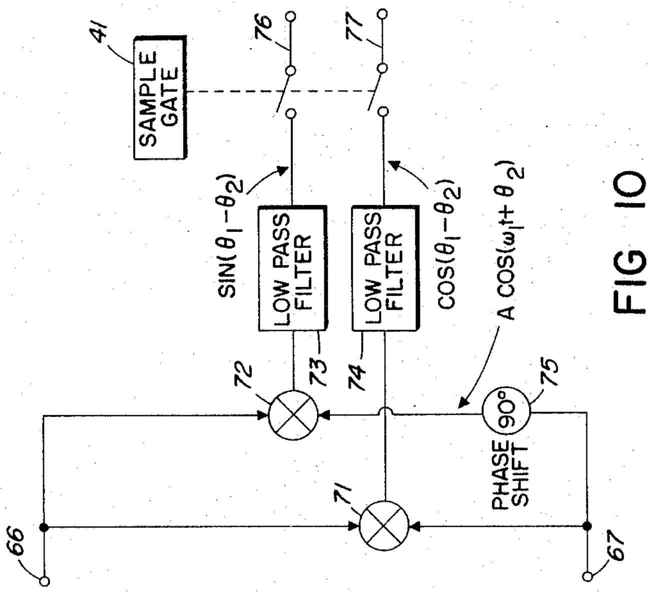
FIGURE 10 is a functional diagram of output circuitry for use with FIGURES 6 and 9.
Figure 9:
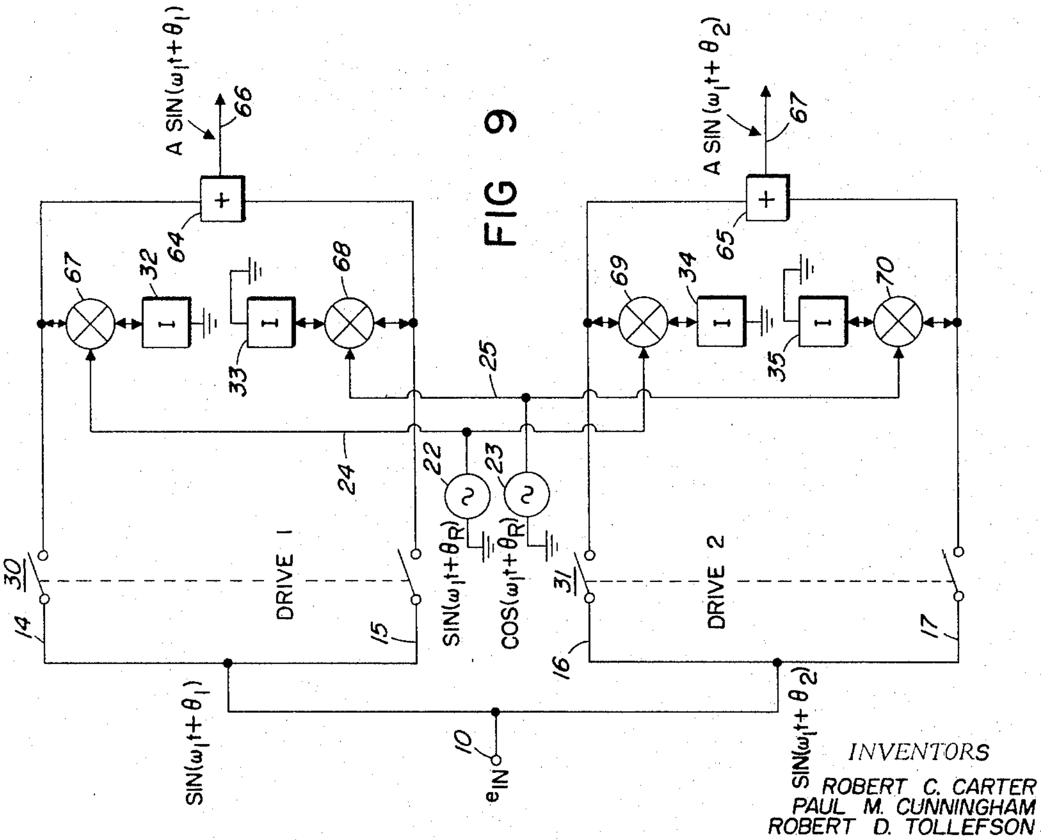
FIGURE 9 is a functional embodiment of a complete system in accordance with FIGURE 8.

By a similar combination, the functions of mixers 21 and 61, mixers 20 and 62, and mixers 19 and 63 of FIGURE 6 may be combined. A complete circuit employing the combination technique of FIGURE 8 for use in processing a single tone from the composite Kineplex input signal to waveforms as depicted in FIGURE 7, is shown in FIGURE 9. The circuitry of FIGURE 9 in conjunction with the output circuitry of FIGURE 10, compares, function-wise, with the embodiment of FIGURE 1 wherein outputs 76 and 77 are developed which are proportional respectively to the sine and cosine functions of the phase shift between adjacent frames.

Mixers 18 and 60 of FIGURE 6 are shown combined as a single mixing function 67 of FIGURE 9. Mixers 21 and 61 are combined as a single mixing means 68. Mixers 20 and 62 are combined as a single mixing means 69. Mixers 19 and 63 are combined as a single mixing means 70. Adding network 64 receives the outputs from mixers 67 and 68 to develop an output 66 corresponding to that of FIGURE 6 while adding network 65 receives the output from mixers 69 and 70 to develop an output 67 corresponding to that of FIGURE 6. The outputs 66 and 67 may then be applied to direct and quadrature phase detecting means as depicted in FIGURE 10. Outputs 66 and 67 are applied directly as inputs to a mixer 71. Output 66 is applied directly and output 67 is applied through a 90° phase shifting network 75, as inputs to a further mixer 72. Mixer 71 develops a product output expressed as:

$$\sin(\omega_1 t+\theta_1)\sin(\omega_1 t+\theta_2)$$

Mixer 72 develops a product output expressed as:

$$\sin(\omega_1 t+\theta_1)\cos(\omega_1 t+\theta_2)$$

From trigonometric identities, the outputs from mixers 71 and 72 may be expressed as sum and difference frequencies; one at D.C. and the output at $2\omega_1 t$. The frequencies at $2\omega_1 t$ are filtered out by low pass filters 73 and 74 and the respective D.C. components, sin $(\theta_1-\theta_2)$ and cos $(\theta_1-\theta_2)$, are sampled by sample gate 41 to develop the outputs 76 and 77 in digital form which corresponds identically with the outputs 76 and 77 of the embodiment of FIGURE 1.

Figure 11:
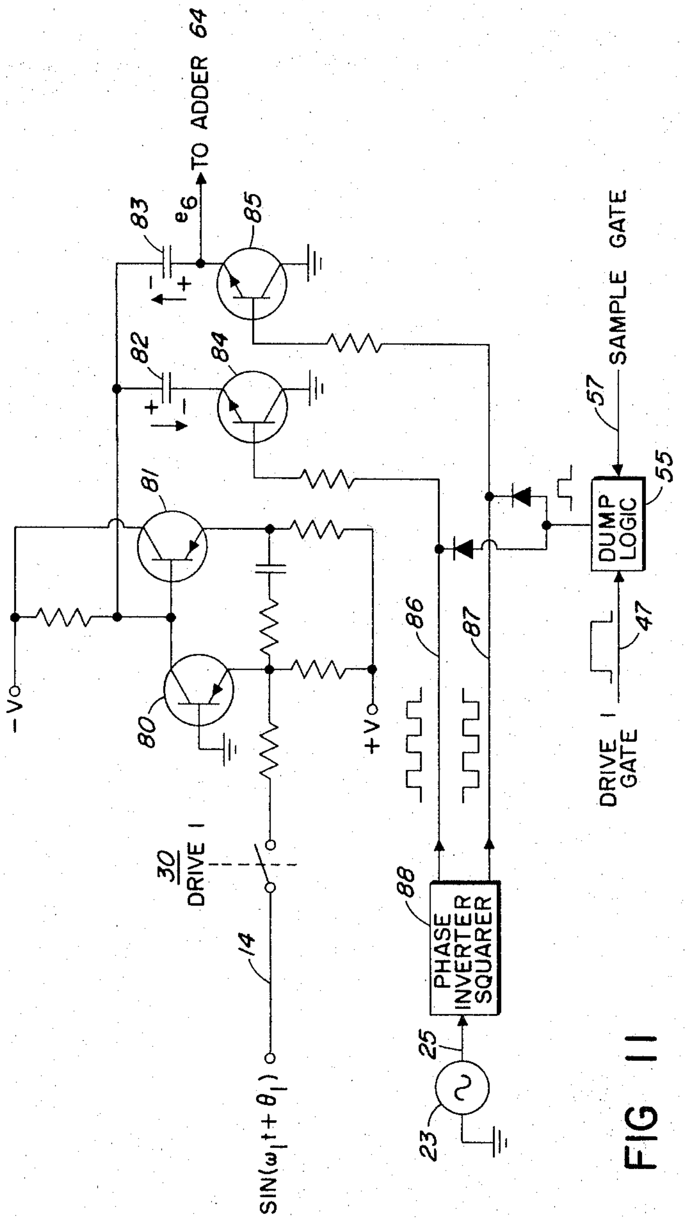
FIGURE 11 is a functional schematic diagram of a type of circuitry providing the function of FIGURE 8.

The above described combination of the mixer functions of the embodiments of FIGURE 6 has been discussed with respect to the functional representation of FIGURE 8. The combination of the drive time switch 30, reference source 23, mixer function 67 and the integrator 32, as represented in FIGURE 8 and carried into the overall system of FIGURE 9, is a functional representation and accordingly does not necessarily indicate a schematic type of circuitry. The mixer 67 might more properly be referred to as a mixing function rather than as a mixer per se in FIGURE 8. Operation-wise the arrangement of FIGURE 8 has been described as mixing the gated input 14 during the closing of the drive time switch 30 with the reference signal 25 to develop a product including a D.C. component for application to an integrator 32. During the succeeding interval when the particular channel is not being driven and drive time switch removes the application of the gating input signal 14, the integrator function 67 chops the D.C. signal developed in integrator 32 with the reference frequency 25 to supply an output to the adding network 64. A particular embodiment of an arrangement to provide the function portrayed in FIGURE 8, is illustrated in FIGURE 11 and described in detail in copending application, Ser. No. 458,157, filed concurrently with the present invention by Robert C. Carter, entitled "R.C. Correlator Circuit for Synchronous Detection." FIGURE 11 portrays basically a circuit described in the copending application. The input signal 14 is seen to be applied through the drive 1 switch 30 to a feedback amplifier comprising transistors 80 and 81, which has essentially infinite output impedance as discussed in the reference copending application. A pair of capacitors 82 and 83 are connected from the feedback amplifier through transistor switches 84 and 85 to ground. The output applied to adding network 64 of FIGURE 6 is taken from the ground side of capacitor 83. The reference source 23, which provides the reference signal 25 defined as cos $(\omega_1 t+\theta_R)$ is seen to be applied to a phase inverter and squaring network 88 from which is developed complementary square wave outputs 86 and 87. The reference wave 86 is applied to the base of switching transistor 84 while the reference wave 87 is applied to the base of switching transistor 85. Transistors 84 and 85 operate as switches being alternately rendered conductive and thus alternately shorting the associated capacitors to ground. The transistors 84 and 85 thus perform the mixing function discussed in conjunction with the FIGURE 8 modification. Considering the reference wave 25 to be in phase with the input signal 14, when signal 14 becomes positive, transistor 84 is shorter and transistor 85 is open. Current will flow into capacitor 82 as indicated in FIGURE 11. On the next half cycle, the input signal 14 is negative and transistor 84 is open with transistor 85 being shorter. Current will then flow through capacitor 83 as indicated in FIGURE 11. After several cycles, voltages accumulate on capacitors 82 and 83 with polarities as indicated. Thus, when the drive time switch 30 is closed, the switching transistors, operating at a rate defined by the reference signal 25, mix the input signal 14 with the reference 25 while the capacitors 82 and 83 charge to perform the integrating function. The output applied to the adding network 64 is thus a chopped D.C. wave, being chopped at the frequency of the reference signal 25.

During the succeeding interval, when drive time switch 30 is opened, the chopping action continues at a rate defined by the reference signal 25 to provide an output of fixed magnitude depending upon the charge accumulation on capacitors 82 and 83 at the end of the preceding drive time.

It is to be realized that the integrator performs an integrating function during drive time, followed by a storage during the succeeding frame, at the conclusion of which the integrator must be dumped or reset to zero. For this purpose the circuitry of FIGURE 11 shows functionally a tie-in with the dump logic of circuitry 53 which, as previously discussed, might develop an output voltage to effect integrator reset by simultaneously rendering each of the transistors 84 and 85 conductive for a predetermined interval so as to discharge both of the capacitors 82 and 83 and thus ready the circuit for a subsequent integrating interval.

The comparison of the demultiplexing and detecting methods shown in the embodiments of FIGURES 1 and 9–10 shows that FIGURE 1 requires eight mixers or product detectors while the embodiment of FIGURES 9–10 requires six mixers. It is further noted that the embodiment of FIGURES 9–10 contains a 90° phase shifter while the embodiment of FIGURE 1 does not require a phase shifter. The embodiment of FIGURE 1 incorporates a four-pole sample switch 36 while the embodiment of FIGURES 9–10 necessitates but a two-pole sample switch.

Generally, the embodiment of FIGURE 1 has an advantage over that of FIGURES 9–10 in that serial readout of a multitone signal is easier. The group of four mixers in the output product detector 78 of FIGURE 1 may be time shared with all other tone-integrator outputs in a multiplexing system; whereas in the embodiment of FIGURES 9–10 a pair of output mixers 71 and 72 would be required for each tone of a multiplexed system.

Each of the methods described herein has an advantage over the conventional mechanical resonator approach as described in the afore-defined references in that the critical frequency requirements are removed from the circuit and that all circuitry is composed of commonplace parts. The most critical circuit elements are the integrators which must be linear, and the mixer applications where mixer outputs are added to cancel out undesired phase components. A further important advantage of the approach of the present invention over that of the mechanical resonator approach is in the stocking of spare parts. The present invention permits one kind of circuit to be used for all tone frequencies in a multiplexing system, and only modulates pertaining to one tone channel need be stocked.

Although this invention has been described with respect to a particular embodiment thereof it is not to be so limited as changes might be made therein which fall within the scope of the present invention as defined in the appended claims.

We claim:

1. A system for detecting a phase-pulse modulated signal, said signal comprising synchronous intervals each interval of which is phase shifted from the preceding interval by a predetermined phase relationship; comprising first multiplying means receiving said input signal and a first reference signal defined as sin $(\omega_1 t+\theta_R)$ and developing the product thereof, second multiplying means receiving said input signal and a second reference signal defined as cos $(\omega_1 t+\theta_R)$ and developing the product thereof, means alternatively gating the outputs from said first and second multiplying means at a rate defined by said input signal intervals to first and second detection channels, each of said detection channels comprising first and second integrating means receiving respectively the afore-defined gated products and developing therefrom outputs proportional respectively to sine $(\theta_S-\theta_R)$ and cos $(\theta_S-\theta_R)$ where $\theta_S$ is the phase angle of said input signal interval; means for gating simultaneously the outputs from the integrators in said first and second channels to a further product detecting means, said further product detecting means comprising multiple mixing means for developing the respective cross-products of the outputs of said integrators in said first channel with those integrators in said second channel, means for adding the cross-products of the outputs of the first integrators in each of said channels with those of the second integrators in each of said channels to develop a first output proportional to cos $(\theta_{s1}-\theta_{s2})$ and means subtracting the cross products of the first integrators of said first channel with those of the second integrators of the second of said channels to develop a second output signal proportional to sin $(\theta_{s1}-\theta_{s2})$ where $(\theta_{s1}-\theta_{s2})$ is the phase shift between successive ones of said input signal intervals.

2. A system as defined in claim 1 wherein the outputs from said integrators are gated to said further product detecting means immediately prior to the end of each said input signal interval, and including synchronous reset means connected with the integrators associated with said first and second channels to alternately reset the integrators in said first channel and those in said second channel to zero output at a rate defined by the time duration of said input signal intervals.

3. A system for detecting a phase-pulsed modulated signal, said signal comprising synchronous intervals each of one of which is phase shifted from a preceding interval by one of a plurality of predetermined phase relationships comprising first and second product detectors each receiving said input signal as a first input; a first source of reference signal defined as sin $(\omega_1 t+\theta_R)$ and a second source of reference signal defined as cos $(\omega_1 t+\theta_R)$, said first and second product detectors being supplied said first and second reference signals as respective second inputs thereto; first and second detection channels, each of said first and second channels comprising first and second integrators, means gating the output of said first and second product detectors as respective inputs to said first and second integrators, the outputs from said first and second product detectors being gated to the integrators associated with said first and second channels alternately at a rate defined by the duration of said input signal intervals, voltage sampling means associated with the outputs of each of said integrators in said first and second channels for sampling the outputs thereof for a predetermined time interval preceding the end of each of said input intervals; first integrator reset means associated with each of the integrators in said first channel, second integrator reset means associated with each of the integrators in said second channel, means for activating said first integrator reset means prior to the end of those input intervals during which said product detector outputs are gated to the integrators in said second channel, means for activating said second integrator reset means prior to the end of those input intervals during which said product detector outputs are gated to the integrators in said first channel; further product detecting means receiving the sampled outputs from the first and second integrators of each of said first and second channels; said further product detecting means comprising multiple signal mixing means for developing the respective cross-products of the outputs of said integrators in said first channel with those in said second channel, means adding the cross-product of the outputs of said first integrators in each of said first and second channels with the cross-product of the outputs of the second integrators in each of said first and second channels to provide a first output signal proportional to cos $(\theta_1-\theta_2)$, and means for subtracting the cross-product of the output from the first intgerator of channel 1 and the second integrator of channel 2 from the cross-product of the outputs from the second integrator of channel 1 and the first integrator of channel 2 to develop a second output signal proportional to sin $(\theta_1-\theta_2)$, where $(\theta_1-\theta_2)$ is the phase shift between successivee ones of said input signal intervals.

4. A system as defined in claim 3 wherein said further product detecting means comprises a first mixing means receiving and multiplying the sampled outputs from said first integrators in each of said first and second channels, a second mixing means receiving and multiplying the sampled outputs from said second integrators in each of said first and second channels, a third mixing means receiving and multiplying the sampled outputs from the first integrator in said first channel and the second integrator in said second channel, a fourth mixing means receiving and multiplying the sampled outputs from the second integrator of said first channel and the first integrator of said second channel, signal adding means receiving the outputs from said fifth and sixth mixers and developing therefrom said first output signal, and signal subtracting means receiving the outputs from said seventh and eighth mixers and developing therefrom said second output signal.

5. A system for detecting a phase-pulse modulated signal, said signal comprising synchronous intervals each one of which is phase shifted from a preceding interval by one of a plurality of predetermined phase relationship, comprising, first and second product detectors, each receiving said input signal as a first input; a first source of reference signal defined as sin $(\omega_1 t+\theta_R)$ and a second source of reference signal defined as cos $(\omega_1 t+\theta_R)$ said first and second product detectors being supplied said first and second reference signals as respective second inputs thereto; first and second detector channels, means alternately gating the outputs from said first and second product detectors to said first and second detector channels at a rate defined by the duration of said input signal intervals; each of said first and second detection channels comprising first and second integrators, signal mixing means receiving the output from each of said integrators and a source of A.C. signal and chopping the outputs of said integrators at a rate determined by the frequency of a chopping signal source; said chopping signal source being quadraturized to provide first and second chopping signals respectively 90° displaced in phase, the first chopping signal establishing a chopping rate for the outputs of the first integrators in each of said first and second channels, the second chopping signal establishing a chopping rate for the outputs of the second integrators in each of said first and second channels; first signal adding means receiving the outputs from the signal chopping means associated with said first detection channel, second signal adding means receiving the outputs from the signal chopping means associated with said second channel, and direct and quadrature phase detecting means receiving the outputs from said first and second adding means as inputs thereto and producing first and second output signals proportional respectively to sin $(\theta_1-\theta_2)$ and cos $(\theta_1-\theta_2)$, where $(\theta_1-\theta_2)$ is the phase shift between successive ones of said input signal intervals.

6. A system as defined in claim 5 wherein the outputs from said direct and quadrature phase detectors are sampled for a predetermined interval prior to the end of each successive input signal interval.

7. A system as defined in claim 5 wherein said first and second chopping signals coincide with said first and second sources of reference signal, respectively.

8. A system as defined in claim 5 wherein said first and second chopping signals establish chopping rates corresponding to the frequency of said first and second reference signals.

9. A system for detecting a phase-pulse modulated signal: said signal having a frequency $\omega_1 t$ and comprising synchronous intervals each interval of which is phase shifted from the preceding interval by a predetermined phase relationship defined as $(\theta_1-\theta_2)$; first mixing means receiving said phase-pulse modulated signal and a first reference signal defined as sin $(\omega_1 t+\theta_R)$ and developing the product thereof, second mixing means receiving said phase-pulse modulated signal and a second reference signal defined as cos $(\omega_1 t+\theta_R)$ and developing the product thereof, first and second detection channels, means gating the outputs from said first and second mixer means alternately to said first and second detection channels at a rate defined by said input signal interval, each of said detection channels comprising first and second integrating means receiving respectively the aforedefined gated products and developing therefrom outputs proportional and respective to sin $(\theta_S-\theta_R)$ and cos $(\theta_S-\theta_R)$; where $(\theta_S-\theta_R)$ is the phase shift between the input signal and said reference signal; third, fourth, fifth and sixth signal mixing means receiving the outputs from the first and second integrators of said first and second channels, respectively as first inputs thereto, a second input to each of said sixth and eighth signal mixing means being said first reference signal, a second input to each of said fifth and seventh mixing means being said second reference signal, a first signal adding means receiving the outputs from said fifth and sixth mixing means and developing a first output signal defined as $A$ sin $(\omega t+\theta_1)$, a second signal adding means receiving the output from said seventh and eighth mixing means and developing a second output signal defined as $A$ sin $(\omega_1 t+\theta_2)$.

10. A system as defined in claim 9 further including first phase detecting means receiving said first output signal as a first input signal thereto and said second output signal as a second input signal thereto, and developing an output defined as cos $(\theta_1-\theta_2)$, a second phase detecting means receiving said first output signal as a first input thereto, and said second output signal phase shifted by 90° as a signal input thereto and developing a second output signal defined as sin $(\theta_1-\theta_2)$.

11. A system as defined in claim 10 wherein the outputs from said first and second phase detecting means are sampled for a period prior to the end of each successive input signal interval.

12. A system as defined in claim 10 wherein each of said first and second phase detecting means comprises a signal mixing means the output of which is applied through a low pass filter, the output from the low pass filter corresponding to the associated one of said output signals.

13. A system for detecting binary data encoded as phase pulse modulation on an input signal, said input signal comprising synchronous intervals each one of which is phase shifted from a preceding interval by a predetermined phase relationship; comprising mixing means receiving said input signal, first and second mutually quadraturized reference signals, said mixing means receiving said input signal and said reference signals and developing therefrom first and second output products respectively comprising direct current components proportional to sin $(\theta_S-\theta_R)$ and cos $(\theta_S-\theta_R)$, where $(\theta_S-\theta_R)$ is the phase shift between said reference signal and said input signal; means gating said first and second products alternately and at a rate defined by the duration of said input signal intervals to first and second pairs of integrators, means associated with said first and second pairs of integrators to alternately reset the integrator pairs to zero at a time preceding the end of each of said input signal interval, means sampling the outputs of the integrators in each of said integrator pairs simultaneously at a time preceding said integrator's reset time during each interval of said input signal, product-detecting means receiving the sampled outputs from said integrators and developing therefrom the respective cross-products of the outputs of said first pair of integrators with the outputs of said second pair of integrators, means adding the cross-products of the outputs of first integrators in each integrator pair with the cross-product of the outputs of the second integrators in each integrator pair to produce a first output signal proportional to cos $(\theta_1-\theta_2)$; means subtracting the cross-product of the output from the first integrator in said first integrator pair and the second integrator in said second integrator pair from the cross-product of the output of the second integrator in said first integrator pair and the first integrator in said second integrator pair to develop a second output signal proportions to sin $(\theta_1-\theta_2)$, where $(\theta_1-\theta_2)$ is the phase shift between successive ones of said input signal intervals.

14. A system as defined in claim 13 wherein said input signal and said first and second reference signals have the same frequency.

15. A system for detecting binary data encoded as phase pulse modulation on an input signal, said input signal comprising synchronous intervals each one of which is phase shifted from a preceding interval by a predetermined phase relationship, comprising mixing means receiving said input signal, first and second mutually quadraturized reference signal, said mixing means receiving sadi input signal and said reference signals and developing therefrom first and second output products respectively comprising direct current components proportional to sin $(\theta_S-\theta_R)$ and cos $(\theta_S-\theta_R)$, where $(\theta_S-\theta_R)$ is the phase shift between said reference signal and said input signal; means gating said first and second products alternately and at a rate defined by the duration of said input signal intervals to first and second pairs of integrators, means associated with said first and second pairs of integrators to alternately reset the integrator pairs to zero at a time preceding the end of each of said input signal intervals, signal chopping means receiving the outputs of the first and second integrators of said first integrator pair and chopping these integrator outputs at a predetermined rate, first signal adding means receiving the chopped outputs from said first pair of integrators, further signal chopping means receiving the output of the first and second integrators of said second integrator pair and chopping the integrator outputs at said predetermined rate, second signal adding means receiving the chopped outputs of said second pair of integrators the output of said first and second signal adding means applied respectively to direct and quadraturized phase detectors, means gating the output from said direct and quadraturized phase detectors to first and second output terminals for a predetermined time interval preceding the end of each of said input signal intervals, said first direct and quadraturized phase detectors developing outputs proportional respectively to sin $(\theta_1-\theta_2)$ and cos $(\theta_1-\theta_2)$, where $(\theta_1-\theta_2)$ is the phase shift between successive ones of said input signal intervals.

16. A system as defined in claim 15 wherein the chopping rate of said first and second signal chopping means is defined by and equal to the frequency of the said input signal.

References Cited

UNITED STATES PATENTS

| | | | |
|---|---|---|---|
| 3,189,826 | 6/1965 | Mitchell et al. | 325—320 X |
| 3,253,223 | 5/1966 | Kettel | 325—321 |
| 3,289,082 | 11/1966 | Shumate | 325—30 |

ROBERT L. GRIFFIN, *Primary Examiner.*

W. S. FROMMER, *Assistant Examiner.*

UNITED STATES PATENT OFFICE
CERTIFICATE OF CORRECTION

Patent No. 3,368,036

February 6, 1968

Robert C. Carter et al.

It is hereby certified that error appears in the above numbered patent requiring correction and that the said Letters Patent should read as corrected below.

Column 19, line 13, for "sixth and eighth" read -- fourth and sixth --; line 14, for "fifth" read -- third --; lines 15 and 19, for "seventh", each occurrence, read -- fifth --; line 17, for "fifth and sixth" read -- third and fourth --; line 20, for "eighth" read -- sixth --.

Signed and sealed this 25th day of March 1969.

(SEAL)
Attest:

Edward M. Fletcher, Jr.
Attesting Officer

EDWARD J. BRENNER
Commissioner of Patents